United States Patent
Kerzner

(10) Patent No.: US 11,232,666 B1
(45) Date of Patent: Jan. 25, 2022

(54) VERIFIED ACCESS TO A MONITORED PROPERTY

(71) Applicant: Alarm.com Incorporated, Tysons, VA (US)

(72) Inventor: Daniel Todd Kerzner, McLean, VA (US)

(73) Assignee: Alarm.com Incorporated, Tysons, VA (US)

( * ) Notice: Subject to any disclaimer, the term of this patent is extended or adjusted under 35 U.S.C. 154(b) by 65 days.

(21) Appl. No.: 16/876,233

(22) Filed: May 18, 2020

Related U.S. Application Data

(63) Continuation of application No. 16/450,214, filed on Jun. 24, 2019, now Pat. No. 10,657,742, which is a continuation of application No. 15/814,297, filed on Nov. 15, 2017, now Pat. No. 10,360,744.

(60) Provisional application No. 62/423,268, filed on Nov. 17, 2016.

(51) Int. Cl.
| | |
|---|---|
| *G07C 9/37* | (2020.01) |
| *H04N 7/18* | (2006.01) |
| *G07C 9/00* | (2020.01) |
| *G06K 9/00* | (2006.01) |

(52) U.S. Cl.
CPC .......... *G07C 9/37* (2020.01); *G07C 9/00563* (2013.01); *H04N 7/181* (2013.01); *H04N 7/185* (2013.01); *G06K 9/00288* (2013.01); *G06K 9/00617* (2013.01)

(58) Field of Classification Search
CPC ...... G07C 9/37; G07C 9/00563; H04N 7/181; H04N 7/185; G06K 9/00288; G06K 9/00617
See application file for complete search history.

(56) References Cited

U.S. PATENT DOCUMENTS

| | | |
|---|---|---|
| 3,609,738 A | 9/1971 | Marte |
| 4,689,610 A | 8/1987 | Dietrich |
| 4,721,954 A | 1/1988 | Mauch |
| 6,971,029 B1 | 11/2005 | Avery, IV et al. |
| 6,972,660 B1 | 12/2005 | Montgomery, Jr. et al. |
| 7,116,211 B1 | 10/2006 | Parker |
| 7,170,998 B2 | 1/2007 | McLintock et al. |

(Continued)

*Primary Examiner* — Chico A Foxx
(74) *Attorney, Agent, or Firm* — Fish & Richardson P.C.

(57) ABSTRACT

A method includes receiving, by a monitoring system that is configured to monitor a property and from a visitor to the property, a personally identifying code and a biometric identifier, determining that the personally identifying code corresponds to a stored personally identifying code, receiving, by the monitoring system, location information that corresponds to locations of the visitor during a time period before visiting the property, comparing the biometric identifier to a stored biometric identifier, based on determining that the personally identifying code corresponds to a stored personally identifying code, comparing the biometric identifier to the stored biometric identifier, and the location information, determining a confidence score that reflects a likelihood that the visitor is authorized to access the property, based on the confidence score that reflects the likelihood that the visitor is authorized to access the property, selecting, from among multiple monitoring system actions, a monitoring system action, and performing the monitoring system action.

20 Claims, 6 Drawing Sheets

(56) References Cited

U.S. PATENT DOCUMENTS

| | | | |
|---|---|---|---|
| 7,377,426 B1 | 5/2008 | Makeever | |
| 7,397,371 B2 | 7/2008 | Martin et al. | |
| 7,876,928 B2 | 1/2011 | Ito et al. | |
| 8,473,748 B2 | 6/2013 | Sampas | |
| 9,009,259 B2 * | 4/2015 | Iwaniszyn | G06Q 30/04 709/217 |
| 9,728,009 B2 | 8/2017 | Boussard et al. | |
| 9,842,120 B1 | 12/2017 | Siris et al. | |
| 10,074,224 B2 * | 9/2018 | Ho | G07C 9/00563 |
| 10,121,301 B1 * | 11/2018 | Ren | G07C 9/00571 |
| 10,303,135 B2 * | 5/2019 | Zhang | H04L 12/2816 |
| 10,657,483 B2 * | 5/2020 | Lyman | G06Q 10/083 |
| 2004/0022422 A1 | 2/2004 | Yamauchi et al. | |
| 2007/0168674 A1 | 7/2007 | Nonaka et al. | |
| 2007/0216764 A1 | 9/2007 | Kwak | |
| 2007/0273474 A1 | 11/2007 | Levine | |
| 2011/0013845 A1 | 1/2011 | Tu et al. | |
| 2012/0280783 A1 | 11/2012 | Gerhardt et al. | |
| 2014/0253285 A1 | 9/2014 | Menzel | |
| 2015/0127712 A1 * | 5/2015 | Fadell | G08B 25/008 709/202 |
| 2015/0194000 A1 | 7/2015 | Schoenfelder et al. | |
| 2016/0300184 A1 * | 10/2016 | Zamer | G06Q 30/016 |
| 2018/0294963 A1 * | 10/2018 | Fontaine | H04L 9/321 |

\* cited by examiner

US 11,232,666 B1

VERIFIED ACCESS TO A MONITORED PROPERTY

CROSS REFERENCE TO RELATED APPLICATIONS

This application is a continuation of U.S. application Ser. No. 16/450,214, filed Jun. 24, 2019, now allowed, which is a continuation of U.S. application Ser. No. 15/814,297, filed Nov. 15, 2017, now U.S. Pat. No. 10,360,744, issued Jul. 23, 2019, which claims the benefit of U.S. Provisional Application No. 62/423,268, filed Nov. 17, 2016, and titled "Verified Access to a Monitored Property." All of these prior applications are incorporated by reference in their entirety.

TECHNICAL FIELD

This disclosure relates to monitoring technology and, for example, monitoring professional home servicing agents at an unattended monitored property.

BACKGROUND

Many people equip homes and businesses with monitoring systems to provide increased security for their homes and businesses.

SUMMARY

Techniques are described for monitoring technology. For example, techniques are described for monitoring professional home servicing agents, such as technicians, at an unattended monitored property.

According to one aspect, a computer implemented method includes the actions of receiving, by a monitoring system that is configured to monitor a property and from a visitor to the property, a personally identifying code and a biometric identifier; determining that the personally identifying code corresponds to a stored personally identifying code; based on determining that the personally identifying code corresponds to a stored personally identifying code, receiving, by the monitoring system, location information that corresponds to locations of the visitor during a time period before visiting the property; comparing the biometric identifier to a stored biometric identifier; based on determining that the personally identifying code corresponds to a stored personally identifying code, comparing the biometric identifier to the stored biometric identifier, and the location information, determining a confidence score that reflects a likelihood that the visitor is authorized to access the property; based on the confidence score that reflects the likelihood that the visitor is authorized to access the property, selecting, from among multiple monitoring system actions, a monitoring system action; and performing the monitoring system action.

These and other implementations can each optionally include one or more of the following features. The action of receiving a sample biometric identifier from the visitor; storing the sample biometric identifier as the stored biometric identifier in association with a personally identifying code specific to the visitor; receiving a request to schedule a visit by the visitor to the property; and in response to receiving the request to schedule the visit by the visitor to the property, providing the personally identifying code to the visitor. The actions further include performing the monitoring system action comprises disarming the monitoring system and granting the visitor access to the property. The action of monitoring the visitor using one or more cameras located throughout the property in response to granting the visitor access to the property. The action of determining, based on data received from the one or more cameras, that the visitor entered an area of the property identified, by a resident of the property, as restricted to the visitor; and in response to determining that the visitor entered the area of the property identified as restricted to the visitor, transmitting, to a computing device of the resident of the property, an alert notification indicating that the visitor entered the area of the property identified as restricted to the visitor.

The action of monitoring the visitor using a body camera worn by the visitor in response to granting the visitor access to the property. The action of determining, based on data received from the body camera worn by the visitor, that the visitor entered an area of the property identified, by a resident of the property, as restricted to the visitor; and in response to determining that the visitor entered the area of the property identified as restricted to the visitor, generating, by the monitoring system, an alarm event. The action of receiving, by the monitoring system, location information that corresponds to locations of the visitor during a time period before visiting the property comprises receiving location information that identifies a path traveled by the visitor during the time period before visiting the property. The actions further include comparing the path traveled by the visitor during the time period before visiting the property to an expected travel path; determining that the path traveled by the visitor deviates from an expected travel path; and based on determining that the path traveled by the visitor deviates from the expected travel path, decreasing the confidence score that reflects the likelihood that the visitor is authorized to access the property.

According to another aspect, a system includes one or more sensors that are located throughout a property, at least one of the one or more sensors being configured to detect a biometric identifier of a visitor to the property; an input device that is configured to detect a personally identifying code; and a monitoring control unit that is configured to receive, from the at least one of the one or more sensors, the biometric identifier of the visitor to the property; receive, from the input device, the personally identifying code; and determine that the personally identifying code corresponds to a stored personally identifying code; and a monitoring server that is configured to receive location information that corresponds to locations of the visitor during a time period before visiting the property based on the personally identifying code corresponding to the stored personally identifying code; and compare the biometric identifier to a stored biometric identifier, where the monitoring control unit is further configured to, based on the personally identifying code corresponding to the stored personally identifying code, comparing the biometric identifier to the stored biometric identifier, and the location information, determine a confidence score that reflects a likelihood that the visitor is authorized to access the property; based on the confidence score that reflects the likelihood that the visitor is authorized to access the property, select, from among multiple monitoring system actions, a monitoring system action; and perform the monitoring system action.

These and other implementations can each optionally include one or more of the following features. The monitoring server is configured to receive a sample biometric identifier from the visitor; store the sample biometric identifier as the stored biometric identifier in association with a personally identifying code specific to the visitor; receive a request to schedule a visit by the visitor to the property; and in response to receiving the request to schedule the visit by the visitor to the property, provide the personally identifying code to the visitor. The monitoring control unit is configured to disarm the monitoring system and grant the visitor access to the property. The monitoring system further includes one or more cameras located throughout the property, and the monitoring control unit is further configured to receive image data from the one or more cameras located throughout the property; and in response to granting the visitor access to the property, monitor the visitor by analyzing the image data received from the one or more cameras located throughout the property. The monitoring server is further configured to determine, based on the image data of the one or more cameras, that the visitor entered an area of the property identified, by a resident of the property, as restricted to the visitor; and in response to determining that the visitor entered the area of the property identified as restricted to the visitor, transmit, to a computing device of the resident of the property, an alert notification indicating that the visitor entered the area of the property identified as restricted to the visitor. The monitoring server is configured to in response to the monitoring control unit granting the visitor access to the property, monitor the visitor using a body camera worn by the visitor. The monitoring server is further configured to determine, based on data received from the body camera worn by the visitor, that the visitor entered an area of the property identified, by a resident of the property, as restricted to the visitor, and the monitoring control unit is configured to in response to the visitor entering the area of the property identified as restricted to the visitor, generate an alarm event. The monitoring server is configured to receive location information that corresponds to locations of the visitor during a time period before visiting the property comprises receiving location information that identifies a path traveled by the visitor during the time period before visiting the property. The monitoring server is further configured to compare the path traveled by the visitor during the time period before visiting the property to an expected travel path; determine that the path traveled by the visitor deviates from an expected travel path; and based on determining that the path traveled by the visitor deviates from the expected travel path, decrease the confidence score that reflects the likelihood that the visitor is authorized to access the property. The monitoring server is configured to compare the path traveled by the visitor during the time period before visiting the property to an expected travel path; determine that the path traveled by the visitor deviates from an expected travel path; determine that the visitor deviated from the expected travel path during a time of day when the visitor is authorized to deviate from the expected travel path; and based on determining that the visitor deviated from the expected travel path during the time of day when the visitor is authorized to deviate from the expected travel path, increase the confidence score that reflects the likelihood that the visitor is authorized to access the property. The monitoring server is configured to compare the path traveled by the visitor during the time period before visiting the property to an expected travel path; determine that the path traveled by the visitor corresponds to an expected travel path; and based on determining that the path traveled by the visitor corresponds to the expected travel path, increase the confidence score that reflects the likelihood that the visitor is authorized to access the property.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for monitoring professional home servicing agents at an unattended monitored property. For example, when residents are not present at a monitored property at a time of service by a technician, the monitoring system may verify an identity of the technician, allow the technician to enter the monitored property upon verification, and monitor the activities of the technician at the property during service. The monitoring system may be configured to verify the identity of the technician upon arrival at the monitored property using a variety of sensors and identification technology, and allow entry to the monitored property by controlling an automated lock to a door of the property. The monitoring system may then monitor the technician's activity through the property using a variety of sensors located at the property or on the technician, and may generate an alarm based on detecting the technician moving to an unexpected area of the property or taking an action the technician is not authorized to take. For example, the monitoring system may generate an alarm if the HVAC technician is in the master bathroom and opens a drawer of a dresser.

Figure 1:
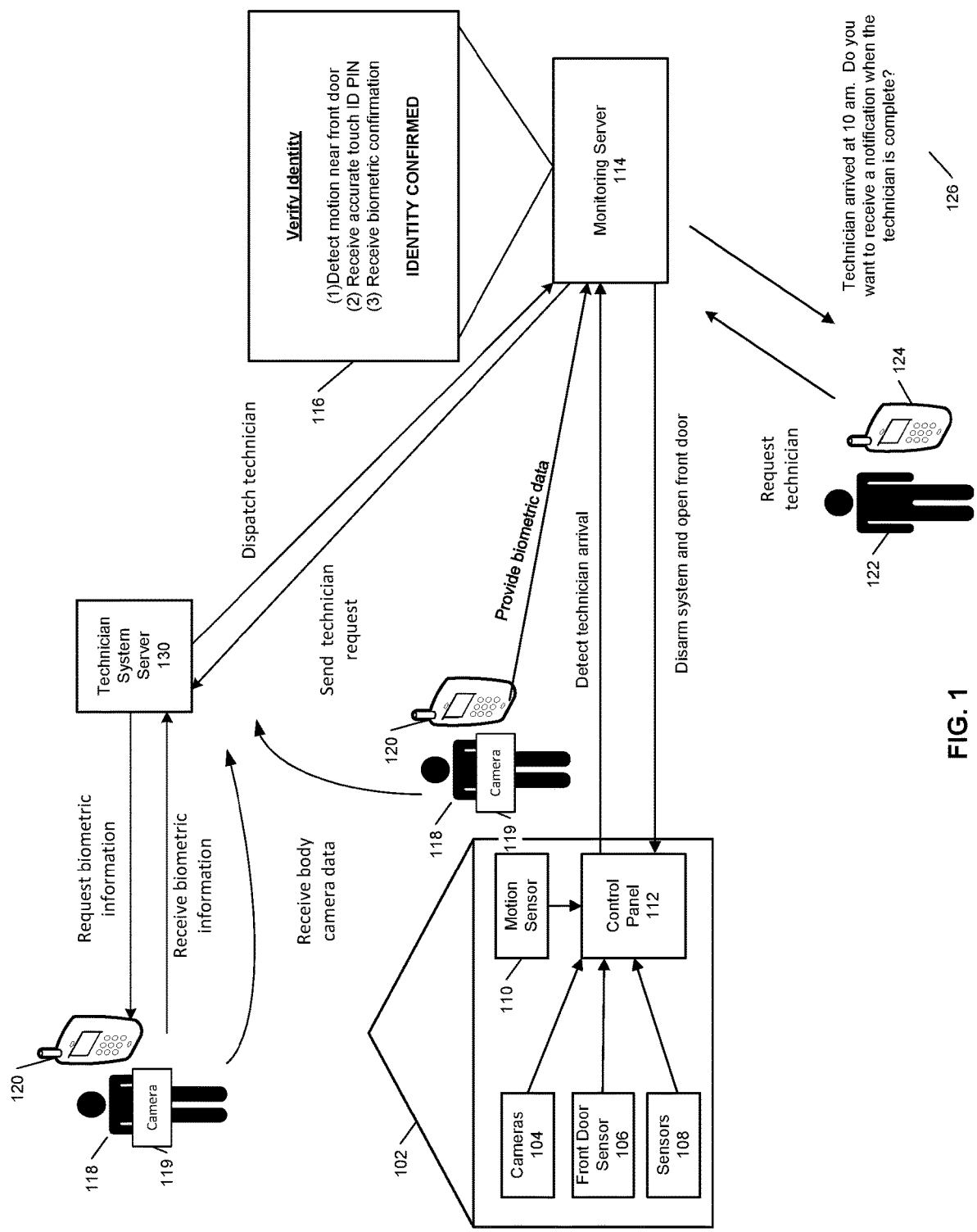
FIG. 1 illustrates an example of verifying a technician, and enabling access to a monitored property.

FIG. 1 illustrates an example of verifying a technician, and enabling access to a monitored property. As shown in FIG. 1, a property 102 (e.g., a home) of a user 122 is monitored by an in-home monitoring system (e.g., in-home security system) that includes components that are fixed within the property 102. The in-home monitoring system may include a control panel 112, one or more cameras 104, a front door sensor 106, one or more additional sensors 108, and a motion sensor 110. The one or more cameras 104 may include video cameras that are located at the exterior of the property near to the front door. The in-home monitoring system may include one or more video cameras that are located throughout the monitored property. The front door sensor 106 is a contact sensor positioned at a front door of the property 102 and configured to sense whether the front door is in an open position or a closed position. The one or more sensors 108 may be any type of electronic sensors and may located throughout the monitored property 102. The motion sensor 110 is configured to sense a moving object within the property 102.

The control panel 112 communicates over a short-range wired or wireless connection with each of the one or more cameras 104, front door sensor 106, one or more sensors 108, and motion sensor 110 to receive sensor data descriptive of events detected by the one or more cameras 104, the front door sensor 106, the one or more sensors 108, and the motion sensor 110. The control panel 112 also communicates over a long-range wired or wireless connection with a monitoring server 114. The monitoring server 114 is located remote from the property 102 and manages the in-home monitoring system at the property 102, as well as other (and, perhaps, many more) in-home monitoring systems located at different properties that are owned by different users. In some implementations, the monitoring server 114 may be located locally at the monitored property 102. The monitoring server 114 receives, from the control panel 112, sensor data descriptive of events detected by the sensors included in the in-home monitoring system of the property 102.

In the example shown in FIG. 1, the monitoring server 114 is in communication with a technician system server 130. The technician system server 130 is a server that is configured to verify and store biometric information associated with one or more professional service agents. A professional service agent may include technicians, plumbers, gardeners, painters, or any other professional service provider. The technician system server 130 is used to validate employees of professional servicing companies. The technician server system 130 performs extensive background checks on employees at the time of hiring to ensure that the hired employee does not have any past indiscretions on record. The technician system server 130 may request biometric information from each of the one or more employees that are registered with the system. The technician system server 130 may request the biometric information from the employee at the time of hiring and use the biometric information to later verify the employee's identity. The biometrics information requested by the technician system server 130 may include finger print scans, retina scans, images, voice recordings, and other suitable biometric type data. The technician system server 130 may store the biometrics data associated with each of the one or more employees of a professional servicing company that are registered with the server 130.

As illustrated in FIG. 1, a user 122 requests a technician, the request may include the type of service required, and the time of the requested service. The request may be sent through the client device 124 of the user 122 to the monitoring server 114. The monitoring server 114 communicates the request to the technician system server 130, and the technician system server 130 identifies a qualified technician based on the received request. The technician system server 130 schedules the dispatch of the identified technician based on the received service request, and communicates the dispatch information to the monitoring server 114. In some examples, the dispatch information may include the name, employee ID number, photograph, biometric information, and demographic information associated with the identified technician. The dispatch information may be communicated by the monitoring server 114 to the client device 124 of the user 122. For example, the monitoring server 114 may send a notification to the user 122 that includes the name, employee ID number, photograph, resume, and confirmed appointment time.

In other examples, the technician system server 130 may receive a request from the user 122 that identifies a specific technician. For example, a user may have used a particular technician in the past and may request that the same technician is dispatched. In yet another example, the technician system server 130 may identify the top three technicians that are qualified and available at the requested time. The technician system server 130 may communicate information associated with each of the three technicians to the monitoring server 114. The monitoring server 114 may in turn communicate the name, photograph, and demographic information for each of the three candidate technicians to the user. The user can then identify, based on the received information, which technician should be dispatched for the service request.

At the scheduled dispatch time, the technician 118 assigned to the service request may use his or her client device 120 to check into the service appointment. The technician system server 130 may verify the identity of the technician 118 using two-factor authentication, such as by verifying entry of the technician's 118 employee identifier and correct passcode plus verification of biometric information of the technician 118. Upon initial verification, the technician system server 130 may track the GPS location of the technician 118 based on the GPS tracker associated with the technician user device 120, and/or the GPS tracker associated with the technician's vehicle. The technician system server 130 may monitor the technician's location to ensure the technician 118 does not make any unwarranted detours or stops while on the way to the user's home 102. The technician system server 130 may generate an alert to the monitoring server 114 if the technician is determined to make any such unwarranted detours or stops while on the way to the service appointment at the monitored property 102. The monitoring server 114 may cancel a service appointment based on receiving an alert from the technician system server 130 indicating that the assigned technician 118 made an unwarranted detour or stop while on the way to the service appointment.

The monitoring server 114 may in turn command the monitoring system at the monitored property 102 to remain armed until the user 122 returns. The monitoring server 114 may also send a text message notification to the user device 124 of the user 122 indicating that the service appointment has been cancelled. In some examples, the technician's vehicle may be equipped with one or more cameras that are in communication with the technician system server 130. In these examples, the one or more cameras monitor the number of occupants in the technician's vehicle. The technician system server 130 may generate an alert to the monitoring server 114 if the technician's vehicle is determined to have more than the expected number of occupants. The monitoring server 114 may cancel a service appointment based on receiving an alert from the technician system server 130 indicating that the technician's vehicle is determined to have more than the expected number of occupants. The monitoring server 114 may in turn command the monitoring system at the monitored property 102 to remain armed until the user 122 returns. The monitoring server 114 may also send a text message notification to the user device 124 of the user 122 indicating that the service appointment has been cancelled.

The technician system server 130 may assign a new technician to the scheduled service appointment if the assigned technician 118 makes any unwarranted detours and/or stops on the way to the monitored property 102, or the technician system server 130 determines that the technician's vehicle has more than the expected number of occupants. The technician system server 130 may assign a different technician based on the type of service requested and the proximity of the technician to the monitored property 102. The technician server system 130 may communicate the updated dispatch information to the monitoring server 114.

The technician system server 130 detects the technician's arrival at the monitored property 102 based on the GPS location tracking of the technician user device 120 and/or the GPS location of the technician's vehicle. When the technician 118 arrives at the monitored property 102, one or more of the cameras 104, and the motion sensor 110 may detect the technician's arrival. The one or more cameras 104 may be video cameras that are mounted to exterior of the monitored property 102, and may record the technician 118 approaching the front door of the property 102. The motion sensor 110 may be a motion sensor mounted to the exterior of the house near to the front door, and may detect the technician 118 approaching the front door of the monitored property 102. The one or more cameras 104 and the motion sensor 110 each communicate the sensed data to the control panel 112. The monitoring server 114 confirms the technician's arrival by receiving a notification from the technician system server 130 confirming the technician's arrival based on GPS tracking, and receiving the sensed data from the control panel 112 at the monitored property 102.

When the technician 118 arrives at the monitored property 102, the technician 118 may enter a digital code on a front door keypad to unlock the front door. The digital code may be a temporary code that is generated by the monitoring server 114 when the arrival of the technician 118 at the monitored property is confirmed. The digital code may be a time sensitive code that is valid for only a short period to ensure that the technician does not attempt to use the digital code in the future to access the monitored property 102 when not authorized. For example, the digital code may be valid for the estimated service appointment time, such as, one hour. The monitoring server 114 communicates the generated digital code to the technician system server 130, and the technician system server 130 provides the digital code to the user device 120 of the technician 118. The digital code may be communicated to the user device 120 of the technician 118 by a text message. The control panel 112 unlocks the front door when the technician 118 enters a valid digital code on the front door keypad.

In some implementations, the front door keypad may be a keypad that can be used to unlock a door instead of using a typical key entry to unlock the door. In these implementations, when the technician 118 enters the digital code to unlock the front door to gain access to the monitored property 102, the technician 118 must enter the monitored property 102 to verify his biometric data at the control panel 112. The control panel 112 may be located at the interior of the monitored property 102 adjacent to the front door. The technician 118 may enter a personal PIN code that is specific to the technician 118 at the control panel 112. The control panel 112 may include a camera that is configured to capture one or more images of the technician 118 as the technician 118 enters his PIN code into the control panel 112 interface. The control unit 112 communicates the received one or more images of the technician 118 to the monitoring server 114.

The monitoring server 114 compares the received images to one or more images associated with the specific PIN code used by the technician 118 to verify the technician's identification. When the technician's identification is verified by identifying a match of the images, the monitoring server 114 commands the control panel 112 to disarm the monitoring system at the monitored property 102. In some implementations, the monitoring server 114 communicates the received images to the technician system server 130, and the technician system server 130 compares the received images to the one or more images associated with the specific PIN code used technician 118 to verify the technician's identification. In these implementations, once the technician's identification is verified by the technician system server 130, the server 130 communicates the verification to the monitoring server 114 which in turn commands the control panel 112 to disarm the monitoring system at the monitored property 102.

In some examples, the control panel 112 may utilize voice recognition to verify the technician's 118 identification. For example, the technician 118 may use voice commands to input the personal PIN code into the control panel 112 interface. The control panel 112 communicates the received voice commands to the monitoring server 114, and the monitoring server 114 may then compare the received voice commands to the technician's recorded voice to verify the technician's identity. In some implementations, the control panel 112 may be configured to verify the technician's biometric information, such as, facial recognition and voice recognition data. The monitoring server 114 commands the control panel 112 to disarm the monitoring system at the monitoring property 102 when the identification of the technician 118 is verified.

The monitoring server 114 may command the control panel 112 to maintain the monitoring system in an armed state if the technician's identification is not confirmed. For example, a technician imposter may arrive at the monitored property and enter the technician PIN code but the one or more images captured by the camera at the control panel will not match the stored biometrics information associated with the technician 118. The monitoring server 114 will not verify the technician identity, and command the monitoring system at the monitoring property 102 to remain in an alarmed state.

The monitoring server 114 may provide the user device 124 of the user 122 a text message notification that includes the determined arrival time of the technician 118. In some examples, the text message notification may include a picture of the verified technician. For the example illustrated in FIG. 1, the text message notification may request whether the user 122 would like to receive a subsequent notification when the technician is complete with the service appointment.

In some implementations, the property may not be monitored by an in-home monitoring system. A user may request a technician through a user client device to the technician system server. The technician system server identifies a qualified technician based on the received request, and schedules the dispatch of the identified technician. The technician server system communicates the dispatch information to the user client device. For example, the technician system server may send a notification to the user client device that includes the name, employee ID number, photograph, resume, and confirmed appointment time of the service appointment.

At the scheduled dispatch time, the technician assigned to the service request may use his or her client device to check into the service appointment. The technician system server may verify the identity of the technician using two-factor authentication, such as by verifying entry of the technician's employee identifier and correct passcode plus verification of biometric information of the technician. Upon initial verification, the technician system server may track the GPS location of the technician based on the GPS tracker associated with the technician user device, and/or the GPS tracker associated with the technician's vehicle. The technician system server may monitor the technician's location to ensure the technician does not make any unwarranted detours or stops while on the way to the user's home. The technician system server may generate an alert to the user client device if the technician is determined to make any such unwarranted detours or stops while on the way to the service appointment at the property.

The technician may be equipped with a body camera 119 that records the technician's activity. When the technician checks into the service appointment, the body camera 119 may automatically start recording the technician's activities as the technician is on the way to the property. In some examples, when the technician checks into service appointment, the technician may manual start the body camera 119. In some examples, the body camera 119 may be configured to transmit the video recording in real time to the user. For example, the video stream may be communicated to an application running on the user's client device. In some examples, the body camera may be configured to locally store the video stream of the technician's activities. In these implementations, the body camera 119 may be configured to locally process the video stream, and may use video analytics data to process the video stream to trigger alerts. The body camera may use deep learning techniques to facilitate real-time object detection and classification.

When the technician arrives at the property, the technician may enter a personal PIN code that is specific to the technician at a control panel that controls access to the property. The control panel may include a camera that is configured to capture one or more images of the technician as the technician enters his PIN code into the control panel interface. The control unit communicates the received one or more images of the technician to the technician system server. The technician system server compares the received images to one or more images associated with the specific PIN code used by the technician to verify the technician's identification. When the technician's identification is verified by identifying a match of the images, a door to the property may be unlocked to allow the technician to access the property.

In some examples, the control panel may utilize voice recognition to verify the technician's identification. For example, the technician may use voice commands to input the personal PIN code into the control panel interface. The control panel communicates the received voice commands to the technician system server, and the technician system server may then compare the received voice commands to the technician's recorded voice to verify the technician's identity. In some implementations, the control panel may be configured to verify the technician's biometric information, such as, facial recognition and voice recognition data. When the technician's identification is verified by identifying a voice match, a door to the property may be unlocked to allow the technician to access the property. In some implementations, the control panel may require confirmation of both forms of biometric information to unlock the door to the property. For example, the control panel may require an image match and a voice match to unlock the door to the property.

When the technician confirms his/her biometric information and enters the monitored property, the technician's activities are constantly monitored by the body camera. In some examples, the video stream from the technician's body camera may be transmitted to the user's client device in real time. For example, the user's client device may host an application that allows the user to view the live stream. In other implementations, the video stream may be communicated to the technician system server. The technician system server may utilize video analytics to process the received video stream, and may generate an alert to the user's client device if an alarm condition is detected. For example, the technician system server may generate an alert to the user's client device if the technician ventures to an unexpected portion of the property.

As described above, the technician may be equipped with a body camera 119 that records the technician's activity at the property. The body camera 119 may be configured to locally store the video stream of the technician's activities. In these implementations, the body camera 119 may be configured to locally process the video stream, and may use video analytics data to process the video stream to trigger alerts. The body camera 119 may use deep learning techniques to facilitate real-time object detection and classification. For example, the camera may trigger an alert to the technician system server if the camera detects that the technician is looking at jewelry at the property. The technician system server may be configured to analyze the received body camera video streams from one or more technicians, and may utilize deep learning algorithms to improve the detection of anomalies over time.

The technician system server may receive technician body camera data from the one or more several technicians that are registered with the server. The technician system server may store the received video data, and may perform data analytics on the data to identify trends within the data. The analyzed data may be used to provide users with statistics for the service appointment at their homes. The data may be used to determine how much time was spent working on required tasks versus how much time the technician spent at the property. For example, the data may be analyzed to determine how much time was spent working on the HVAC system versus the total time the technician spent at the property.

Figure 2:
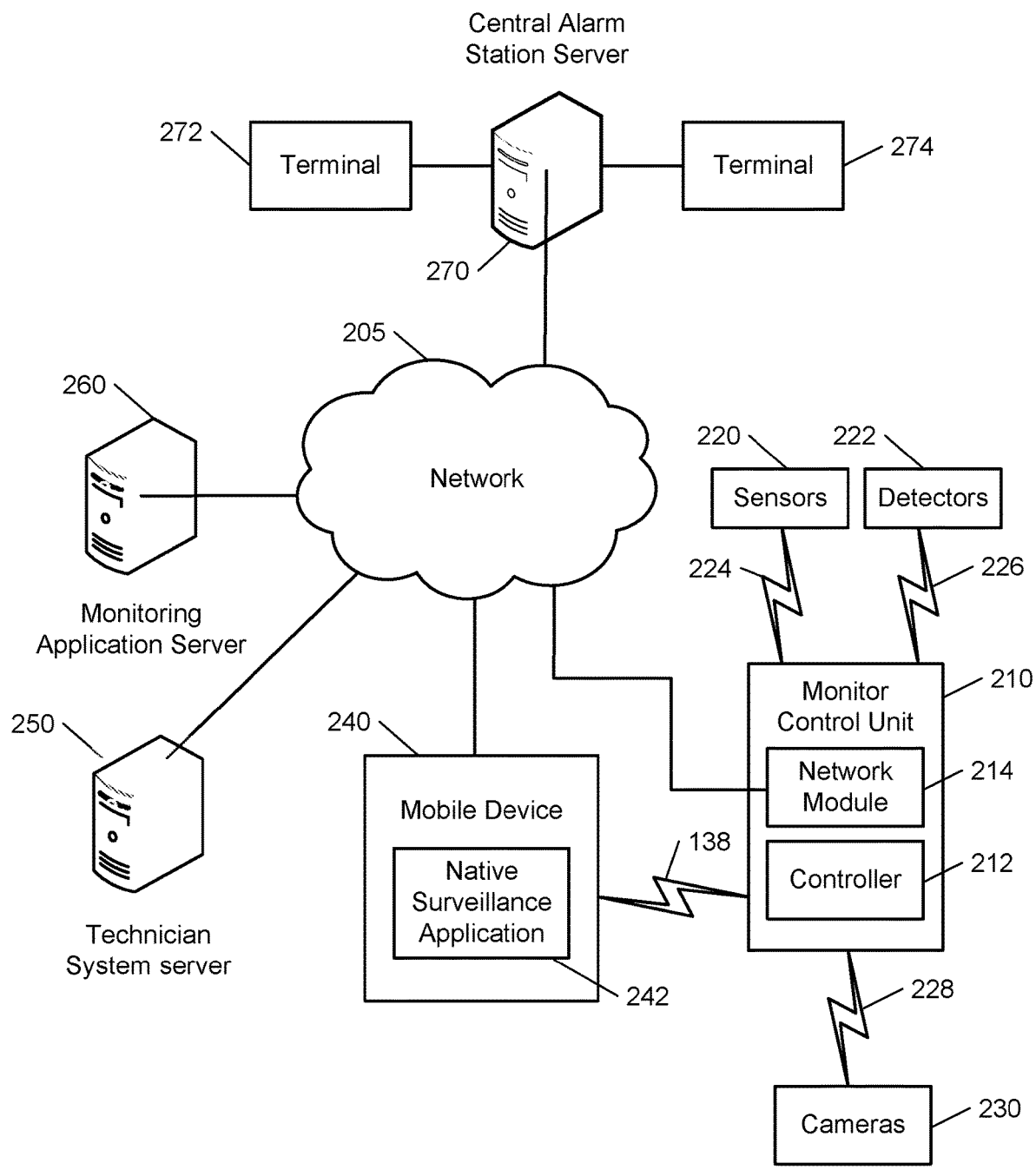
FIG. 2 illustrates an example system for verifying a technician, and enabling access to a monitored property.

FIG. 2 illustrates an example of a system 200 configured to monitor a property and enable access to the property based on a verified technician identity. The system 200 includes a network 205, a monitoring system control unit 210, one or more user devices 240, a monitoring application server 260, a monitor control unit 210, and a technician system server 250. In some examples, the network 205 facilitates communications between the monitor control unit 210, the one or more user devices 240, the monitoring application server 260, and the technician system server 250.

The network 205 is configured to enable exchange of electronic communications between devices connected to the network 205. For example, the network 205 may be configured to enable exchange of electronic communications between the monitor control unit 210, the one or more user devices 240, the monitoring application server 260, and the technician system server 250. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitor control unit 210 includes a controller 212 and a network module 214. The controller 212 is configured to control a monitoring system (e.g., a home alarm or security system) that includes the monitor control unit 210. In some examples, the controller 212 may include a processor or other control circuitry configured to execute instructions of a program that controls operation of an alarm system. In these examples, the controller 212 may be configured to receive input from sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring control unit 210 to communicate over a local area network and/or the Internet. The network module 214 also may be a voiceband modem configured to enable the alarm panel to communicate over the telephone lines of Plain Old Telephone Systems (POTS).

The monitoring system that includes the monitor control unit 210 includes one or more sensors, one or more motion detectors, and one or more cameras. For example, the monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The one or more cameras 230 may be a video/photographic camera or other type of optical sensing device configured to capture images. For instance, the one or more cameras 230 may be configured to capture images of an area within a building monitored by the monitor control unit 210. The one or more cameras 230 may be configured to capture single, static images of the area and also video images of the area in which multiple images of the area are captured at a relatively high frequency (e.g., thirty images per second). The one or more cameras 230 may be controlled based on commands received from the monitor control unit 210.

The one or more cameras 230 may be triggered by several different types of techniques. For instance, a Passive Infra Red (PIR) motion sensor may be built into the one or more cameras 230 and used to trigger the one or more cameras 230 to capture one or more images when motion is detected. The one or more cameras 230 also may include a microwave motion sensor built into the camera and used to trigger the camera to capture one or more images when motion is detected. Each of the one or more cameras 230 may have a "normally open" or "normally closed" digital input that can trigger capture of one or more images when external sensors (e.g., the sensors 220, PIR, door/window, etc.) detect motion or other events. In some implementations, at least one camera 230 receives a command to capture an image when external devices detect motion or another potential alarm event. The camera may receive the command from the controller 212 or directly from one of the sensors 220.

In some examples, the one or more cameras 230 triggers integrated or external illuminators (e.g., Infra Red, Z-wave controlled "white" lights, lights controlled by the module 222, etc.) to improve image quality when the scene is dark. An integrated or separate light sensor may be used to determine if illumination is desired and may result in increased image quality.

The sensors 220, the detectors 222, and the cameras 230 communicate with the controller 212 over communication links 224, 226, and 228. The communication links 224, 226, and 228 may be a wired or wireless data pathway configured to transmit signals from the sensors 220, the detectors 222, and the cameras 230 to the controller 212. The sensors 220 and the cameras 230 may continuously transmit sensed values to the controller 212, periodically transmit sensed values to the controller 212, or transmit sensed values to the controller 212 in response to a change in a sensed value.

The communication link 228 over which the cameras 230 and the controller 212 communicate may include a local network. The cameras 230 and the controller 212 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 260 is an electronic device configured to provide monitoring services by exchanging electronic communications with the monitor control unit 210, and the one or more user devices 240, over the network 205. For example, the monitoring application server 260 may be configured to monitor events (e.g., alarm events) generated by the monitor control unit 210. In this example, the monitoring application server 260 may exchange electronic communications with the network module 214 included in the monitoring system control unit 210 to receive information regarding events (e.g., alarm events) detected by the monitoring system control unit 210. The monitoring application server 260 also may receive information regarding events (e.g., alarm events) from the one or more user devices 240.

The one or more user devices 240 are devices that host and display user interfaces. The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a native surveillance application 242. The native surveillance application 242 refers to a software/firmware program running on the corresponding mobile device that enables the user interface and features described throughout. The user device 240 may load or install the native surveillance application 242 based on data received over a network or data received from local media. The native surveillance application 442 runs on mobile devices platforms, such as iPhone, iPod touch, Blackberry, Google Android, Windows Mobile, etc. The native surveillance application 242 enables the user device 140 to receive and process image and sensor data from the monitoring system.

The central alarm station server 270 is an electronic device configured to provide alarm monitoring service by exchanging communications with the monitor control unit 210, the one or more user devices 240, and the monitoring application server 260 over the network 205. For example, the central alarm station server 270 may be configured to monitor alarm events generated by the monitoring system control unit 210. In this example, the central alarm station server 270 may exchange communications with the network module 214 included in the monitor control unit 210 to receive information regarding alarm events detected by the monitor control unit 210. The central alarm station server 270 also may receive information regarding alarm events from the one or more user devices 240.

The central alarm station server 270 is connected to multiple terminals 272 and 274. The terminals 272 and 274 may be used by operators to process alarm events. For example, the central alarm station server 270 may route alarm data to the terminals 272 and 274 to enable an operator to process the alarm data. The terminals 272 and 274 may include general-purpose computers (e.g., desktop personal computers, workstations, or laptop computers) that are configured to receive alarm data from a server in the central alarm station server 270 and render a display of information based on the alarm data. For instance, the controller 212 may control the network module 214 to transmit, to the central alarm station server 270, alarm data indicating that a sensor 220 detected a door opening when the monitoring system was armed. The central alarm station server 270 may receive the alarm data and route the alarm data to the terminal 272 for processing by an operator associated with the terminal 272. The terminal 272 may render a display to the operator that includes information associated with the alarm event (e.g., the name of the user of the alarm system, the address of the building the alarm system is monitoring, the type of alarm event, etc.) and the operator may handle the alarm event based on the displayed information. In some implementations, the terminals 272 and 274 may be mobile devices or devices designed for a specific function. Although FIG. 2 illustrates two terminals for brevity, actual implementations may include more (and, perhaps, many more) terminals.

In some implementations, the one or more user devices 240 communicate with and receive monitoring system data from the monitor control unit 210 using the communication link 238. For instance, the one or more user devices 240 may communicate with the monitor control unit 210 using various local wireless protocols such as wife, Bluetooth, zwave, zigbee, HomePlug (ethernet over powerline), or wired protocols such as Ethernet and USB, to connect the one or more user devices 240 to local security and automation equipment. The one or more user devices 240 may connect locally to the monitoring system and its sensors and other devices. The local connection may improve the speed of status and control communications because communicating through the network 205 with a remote server (e.g., the monitoring application server 260) may be significantly slower.

The technician system server 250 is an electronic device configured to provide monitoring services by exchanging electronic communications with the monitoring application server 260, and the one or more user devices 240, over the network 205. For example, the technician system server 250 may be configured to monitor the GPS location of one or more technicians.

Figure 3:
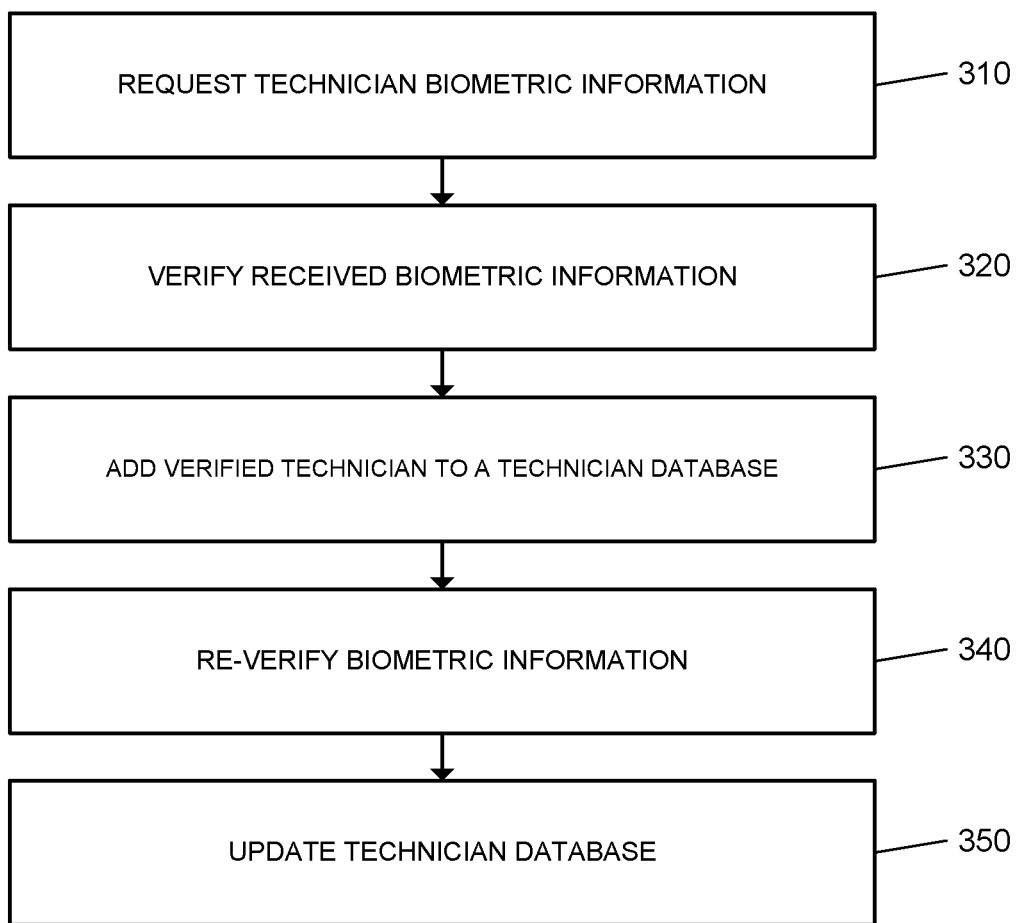
FIG. 3 is a flow chart of an example process for updating a technician database.

FIG. 3 illustrates an example process 300 for updating a technician database. The technician system server 250 requests technician biometric information (310). The technician system server 250 is a server that is configured to verify and store biometric information associated with one or more professional service agents, such as, technicians, plumbers, gardeners, and painters, etc. The technician system server 250 may verify employees of one or more different professional service companies. For example, the technician system server 250 may request biometric information from a technician to initiate the hiring process. The technician server system 250 may request one or more images of the technician, finger print scans, retina scans, and/or voice recordings. In some implementations, the technician system server 250 may send the biometrics requests to the mobile device of the technician. The technician may use his mobile device to capture the requested biometrics information. For example, the user may use his mobile device to capture one or more images of himself and to capture voice recordings. The captured biometrics information may be communicated to the technician system server 250 by a text message. In some other implementations, the user may report to a physical location to provide his biometric information. For example, the technician may report to the physical location to provide finger print scans, retina scans, voice recordings, and one or more images to use for facial recognition.

The technician system server 250 verifies the received biometrics information (320). The technician system server 250 may compare the biometrics information received from the technician against national and global security databases to ensure that the technician clears a background check. The technician system server 250 verifies the biometric information received from the technician if the technician passes the background check, and his images, finger prints, and other biometric scans do not generate any matches to individuals in criminal, espionage, or sex offender databases. The technician system server 250 adds the verified technician to a technician database (330). The technician database is an electronic database associated with the technician system server 250 that is configured to store biometric information associated with each of the one or more technicians that are verified by the server system 250. The technical system server 250 may send a personal PIN code to the mobile device of the technician when the technician is verified by the server system 250. The PIN code is generated by the technician server system 250 and is unique to the technician based on the provided biometrics information, and the provided cellular phone number. The PIN code may be used by the technician system server 250 in the future to verify the technician.

The technician system server 250 re-verifies the biometric information received from a technician (340). The technician system server 250 may periodically compare the biometrics data associated with a technician against national and global security databases to ensure that the technician still has no flags on his record. For example, the system server may verify the technician biometrics data once every month, once every three months, or any other suitable period. The technician system server 250 updates the technician database (350). The technician is included in the updated database if the technician's biometric data is verified and continues to be clear of any criminal, espionage, or sex offender background. The technician is removed from the updated database if the technician's biometric data is not verified, and the system server 250 cancels the technician's personal PIN code.

Figure 4:
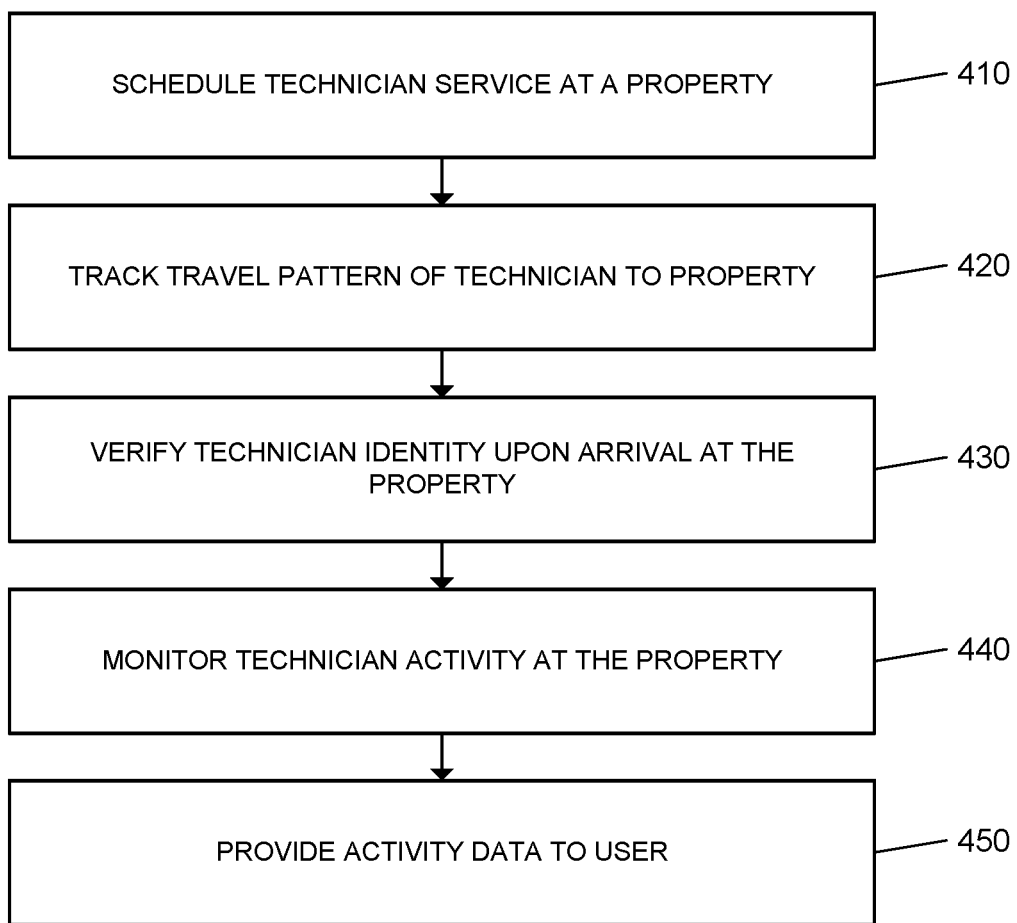
FIG. 4 is a flow chart of an example process for monitoring technician activity at a property.

FIG. 4 is a flow chart of an example process 400 for monitoring technician activity at a property. The system 200 schedules technician service at a monitored property (410). For example, a user associated with the monitored property requests a technician, and the technician system server 250 schedules the service appointment. The user request may be received at the monitor control unit 210, and may include the type of service required and the time of the requested service. The request may be communicated to the monitor control unit 210 through the user's mobile device 240. The monitor control unit 210 then communicates the request to the technician system server 250. The technician system server 250 identifies a qualified technician from a technician database based on the received request, and schedules the technician service at the monitored property for a specific date and time with the identified technician. The technician database is an electronic database associated with the technician system server 250 that is configured to store biometric information associated with each of the one or more technicians that are verified by the server system 250. The technical system server 250 may send a personal PIN code to the mobile device of the technician when the technician is initially verified by the server system 250. The PIN code is unique to the technician based on the provided biometric data, and may be used by the technician system server 250 to verify the technician.

The scheduled service technician and the time of the scheduled service is communicated to the monitor control unit 210. In some examples, the technical system server 250 communicates the biometric data associated with the identified technician to the monitor control unit 210. The monitor control unit 210 may provide the user that requested the service a schedule confirmation that includes a portion of the biometrics data receive from the technician system server 250. For example, the monitor control unit 210 may provide the user with a picture of the technician and the confirmed service time.

The system 200 tracks the travel pattern of technician to property (420). At a scheduled dispatch time, the technician uses his mobile device to check into the service appointment. The technician system server 250 tracks the GPS location of the technician based on the GPS tracker on the technician's mobile device and a GPS tracker associated with the technician's vehicle. The GPS location of the technician is monitored to ensure that the technician does not make any unexpected stops and or detours on the way to the monitored property. The technician system server 250 generates an alert to the monitoring control unit 210 if the system server determines, based on GPS location data, that the technician has made an unexpected detour. In some implementations, the monitor control unit 210 may cancel a service appointment based on receiving an alert from the technician system server 250 indicating that the technician made an unwarranted detour. The monitor control unit 210 may command the monitoring system at the property to remain in an armed state until the user returns.

The technician system server 250 may be configured to monitor the number of occupants in the technician's vehicle while the technician is on the way to the property. The technician's vehicle may be equipped with one or more cameras that are in communication with the technician system server 250. The technician system server 250 may generate an alert to the monitor control unit 210 if the technician's vehicle is determined to have more than the expected number of occupants.

The system 200 verifies the technician identity upon arrival at the property (430). The technician system server 250 may detect the technicians' arrival at the property based on the GPS location information associated with the technician's mobile device and the technician's vehicle. The monitor control unit 210 may detect the technician's arrival at the property based on input from one or more motion sensors, one or more cameras, or one or more sensors. For example, the monitor control unit 250 may detect the technician's arrival based on input received by a motion sensor near the front door of the property, and input received from a camera adjacent to the front door. When the arrival of the technician at the property is confirmed by the monitor control unit 210, the monitor control unit 210 generates a time sensitive digital code that is communicated to the mobile device of the technician. The technician may enter the received code on the keypad adjacent to the front door to unlock the front door. The monitor control unit 210 may then verify the technician's biometric data at the controller 212 interface. The controller 212 may be located at the interior of the property adjacent to the front door. The technician enters his personal PIN code assigned to him by the technician system server 250 at the controller 212. The controller 212 interface may include a camera and a speaker that are configured to receive biometric data from the technician. For example, the controller 212 may be configured to capture one or more images of the technician as the technician enters his personal PIN code. In some implementations, the controller 212 may be configured to receive voice input from the technician. For example, the user may speak him personal PIN code to the speaker of the controller 212.

The biometric data received by the controller 212 is communicated to the monitoring server 260 for verification. In some examples, the monitoring server 260 may require receiving one or more form of biometrics data confirmation to verify the technician's identity. For example, the monitoring server 260 may require receiving a PIN code match confirmation, a voice recognition match confirmation, and a facial recognition match confirmation to verify the technician's identification. In other examples, the monitoring server 260 may require receiving a subset of biometrics data confirmation to verify the technician's identity. For example, the monitoring server 260 may require receiving a PIN code match confirmation and a facial recognition match confirmation to verify the technician's identification. In these examples, the monitoring server 260 receives the biometrics data associated with the dispatched technician from the technician database associated with the technician system server 250. The monitoring server 260 compares the biometrics data received from the technician system server 250 with the biometrics data received from the controller 212.

In some implementations, the monitoring application 260 communicates the biometrics data collected at the controller to the technician system server 250 to verify. In these implementations, the technician system server 250 will compare the received biometrics data to the biometrics data associated with the dispatched technician which is stored at the technician database.

The system 200 monitors technician activity at the property (440). The monitoring system at the monitored property allows access to the property when the technician's identity is verified. Based on technician identity verification, the monitoring system may allow the technician to have access to a portion of the monitored property. For example, a plumber entering the monitored property to fix the bathroom on the lower level of a two story property may have access only to the lower level. The motion detectors, contact sensors, and cameras on the lower level may be in a disarmed state to allow the plumber to move through the level without triggering the alarm. However, the motion detectors, contact sensors, and cameras on the upper level stay in an armed state, and will trigger an alarm if the technician is detected by any of the sensors and or detectors on the second level.

The one or more cameras throughout the monitored property may video record the technician while the technician is at the monitored property. The one or more cameras may be pan/tilt cameras that are configured to adjust their position to capture single static images and/or multiple images. Each of the one or more cameras may have a wide angle lens which increases the field of view of the camera. The images captured by the one or more camera are communicated to the monitoring server 260 in real time as the technician works at the monitored property.

The one or more sensors throughout the monitored property, such as, door contact sensors, window contact sensors, and motion detectors may monitor the technician while the technician is at the monitored property. The monitoring server 260 may command the one or more sensors to sense data more frequently when the technician enters the property. For example, the monitoring server 260 may command the sensors to sense data every three minutes.

The technician system server 250 may monitor the technician's activity while at the monitored property. The technician may be equipped with a body camera that is configured to record the technician's activity. The technician system server 250 may control the body camera, and may be configured to cause the body camera to start recording when the technician arrives at the monitored property. In some examples, the technician may manually start the body camera recording when he arrives at the property. The technician server system 250 may be configured to send a text notification to the mobile device of the technician to remind the technician to start the body camera recording when the technician arrives at the monitored property. The technician system server 250 may monitor the received video data received from the technician body camera, and may generate an alert to the monitoring server if the technician ventures to an unexpected portion of the property. In some implementations, the technician system server 250 may be configured to deploy a drone to the property. The drone may be configured to autonomously patrol the monitored property perimeter for any unexpected activity while the technician is at the monitored property. For example, the drone may confirm that the technician is the only person at the property.

The system 200 provides technician activity data to user (450). The technician system server 250 may provide the user with real time data associated with the technician's activity at the monitored property. For example, the technician system server 250 may send a text notification informing the user when the technician checks in for the scheduled appointment. The technician system server 250 may notify the user when the technician arrives at the monitored property, and when the technician has completed the service and left the property. In some implementations, the technician system server 250 may facilitate a user to view a live stream of the technician's body camera footage as the technician completes the service appointment at the monitored property. In other implementations, the technician system server 250 may compile the video footage received from the technician's body camera, and provide the user with the complied video file.

Figure 5:
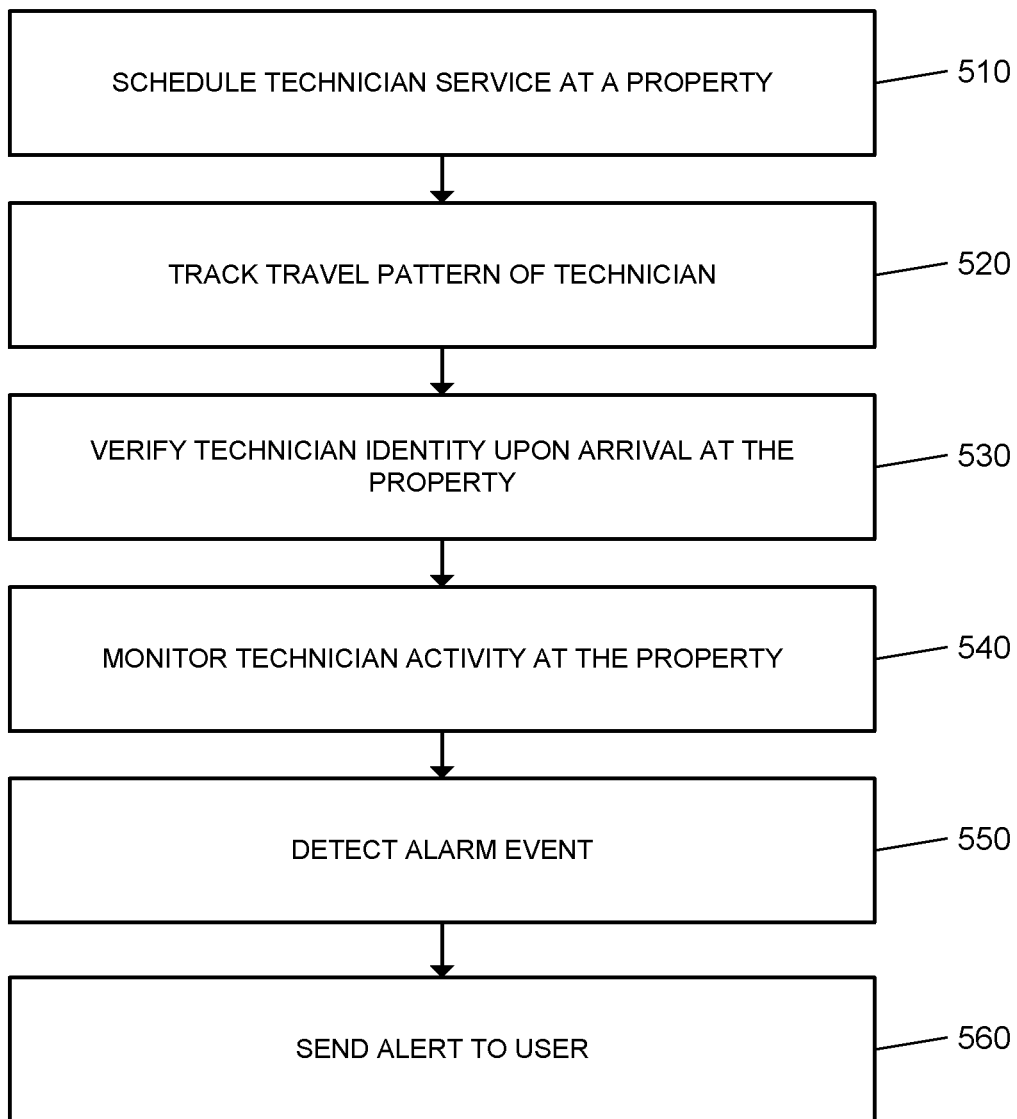
FIG. 5 is a flow chart of an example process for detecting an alarm event at the property.

FIG. 5 is a flow chart of an example process 500 for sending an alert to the user. The system 200 schedules technician service at a monitored property (510). For example, a user associated with the monitored property requests a technician, and the technician system server 250 schedules the service. The user request may be received at the monitor control unit 210, and may include the type of service required and the time of the requested service. The request may be communicated to the monitor control unit 210 through the user's mobile device 240. The monitor control unit 210 then communicates the request to the technician system server 250. The technician system server 250 identifies a qualified technician from a technician database based on the received request, and schedules the technician service at the monitored property for a specific date and time with the identified technician. The technician database is an electronic database associated with the technician system server 250 that is configured to store biometric information associated with each of the one or more technicians that are verified by the server system 250. The technical system server 250 may send a personal PIN code to the mobile device of the technician when the technician is initially verified by the server system 250. The PIN code is unique to the technician based on the provided biometric data, and may be used by the technician system server 250 to verify the technician.

The system 200 tracks the travel pattern of technician to property (520). At a scheduled dispatch time, the technician uses his mobile device to check into the service appointment. The technician system server 250 tracks the GPS location of the technician based on the GPS tracker on the technician's mobile device and a GPS tracker associated with the technician's vehicle. The GPS location of the technician is monitored to ensure that the technician does not make any unexpected stops and or detours on the way to the monitored property. The technician system server 250 generates an alert to the monitoring control unit 210 if the system server determines, based on GPS location data, that the technician has made an unexpected detour. In some implementations, the monitor control unit 210 may cancel a service appointment based on receiving an alert from the technician system server 250 indicating that the technician made an unwarranted detour. The monitor control unit 210 may command the monitoring system at the property to remain in an armed state until the user returns.

The technician system server 250 may be configured to monitor the number of occupants in the technician's vehicle while the technician is on the way to the property. The technician's vehicle may be equipped with one or more cameras that are in communication with the technician system server 250. The technician system server 250 may generate an alert to the monitor control unit 210 if the technician's vehicle is determined to have more than the expected number of occupants.

The system 200 verifies the technician identity upon arrival at the property (530). The technician system server 250 may detect the technicians' arrival at the property based on the GPS location information associated with the technician's mobile device and the technician's vehicle. The monitor control unit 210 may detect the technician's arrival at the property based on input from one or more motion sensors, one or more cameras, or one or more sensors. For example, the monitor control unit 250 may detect the technician's arrival based on input received by a motion sensor near the front door of the property, and input received from a camera adjacent to the front door. When the arrival of the technician at the property is confirmed by the monitor control unit 210, the monitor control unit 210 generates a time sensitive digital code that is communicated to the mobile device of the technician. The technician may enter the received code on the keypad adjacent to the front door to unlock the front door. The monitor control unit 210 may then verify the technician's biometric data at the controller 212 interface. The controller 212 may be located at the interior of the property adjacent to the front door. The technician enters his personal PIN code assigned to him by the technician system server 250 at the controller 212. The controller 212 interface may include a camera and a speaker that are configured to receive biometric data from the technician. For example, the controller 212 may be configured to capture one or more images of the technician as the technician enters his personal PIN code. In some implementations, the controller 212 may be configured to receive voice input from the technician. For example, the user may speak him personal PIN code to the speaker of the controller 212.

The biometric data received by the controller 212 is communicated to the monitoring server 260 for verification. In some examples, the monitoring server 260 may require receiving biometrics data confirmation for each available type of biometrics to verify the technician's identity. For example, the monitoring server 260 may require receiving a PIN code match confirmation, a voice recognition match confirmation, and a facial recognition match confirmation to verify the technician's identification.

The system 200 monitors technician activity at the property (540). The monitoring system at the monitored property allows access to the property when the technician's identity is verified. Based on technician identity verification, the monitoring system may allow the technician to have access to a portion of the monitored property. The one or more cameras throughout the monitored property may video record the technician while the technician is at the monitored property. The one or more camera may be pan/tilt cameras that are configured to adjust their position to capture single static images and/or multiple images. Each of the one or more cameras may have a wide angle lens which increases the field of view of the camera. The images captured by the one or more camera are communicated to the monitoring server in real time as the technician works at the monitoring property.

The technician system server 250 may monitor the technician's activity while at the monitored property. The technician may be equipped with a body camera that is configured to record the technician's activity. The technician system server 250 may control the body camera, and may be configured to cause the body camera to start recording when the technician arrives at the monitored property. The technician system server 250 may monitor the received video data received from the technician body camera, and may generate an alert to the monitoring server if the technician ventures to an unexpected portion of the property.

The system 200 detects an alarm event at the monitored property (550). The monitoring server 260 may detect an alarm event when the technician enters an unexpected room of the monitored property. For examples, the monitoring server 260 may detect an alarm event if the one or more cameras at the monitored property detect the Internet technician in the nursery. The monitoring server 260 may detect an alarm event if the one or more cameras, one or more sensors at the monitored property detect that the technician is not the only person at the property. For example, the monitoring server may detect an alarm event if the one or more cameras indicate that the technician is in the basement working on the HVAC system and a window sensor on the first floor detects that the window has been opened. In this example, the monitoring system 260 may sound an audible alarm and dispatch emergency services if at least one camera confirms a second person is at the property.

The system 200 sends an alert to the user (560). The monitoring server 260 may send an alert to the user based on detecting an alarm event at the monitored property. For example, the monitoring server 260 may send a text notification to the mobile device of the user to indicate that the technician moved to an unexpected location of the property.

Figure 6:
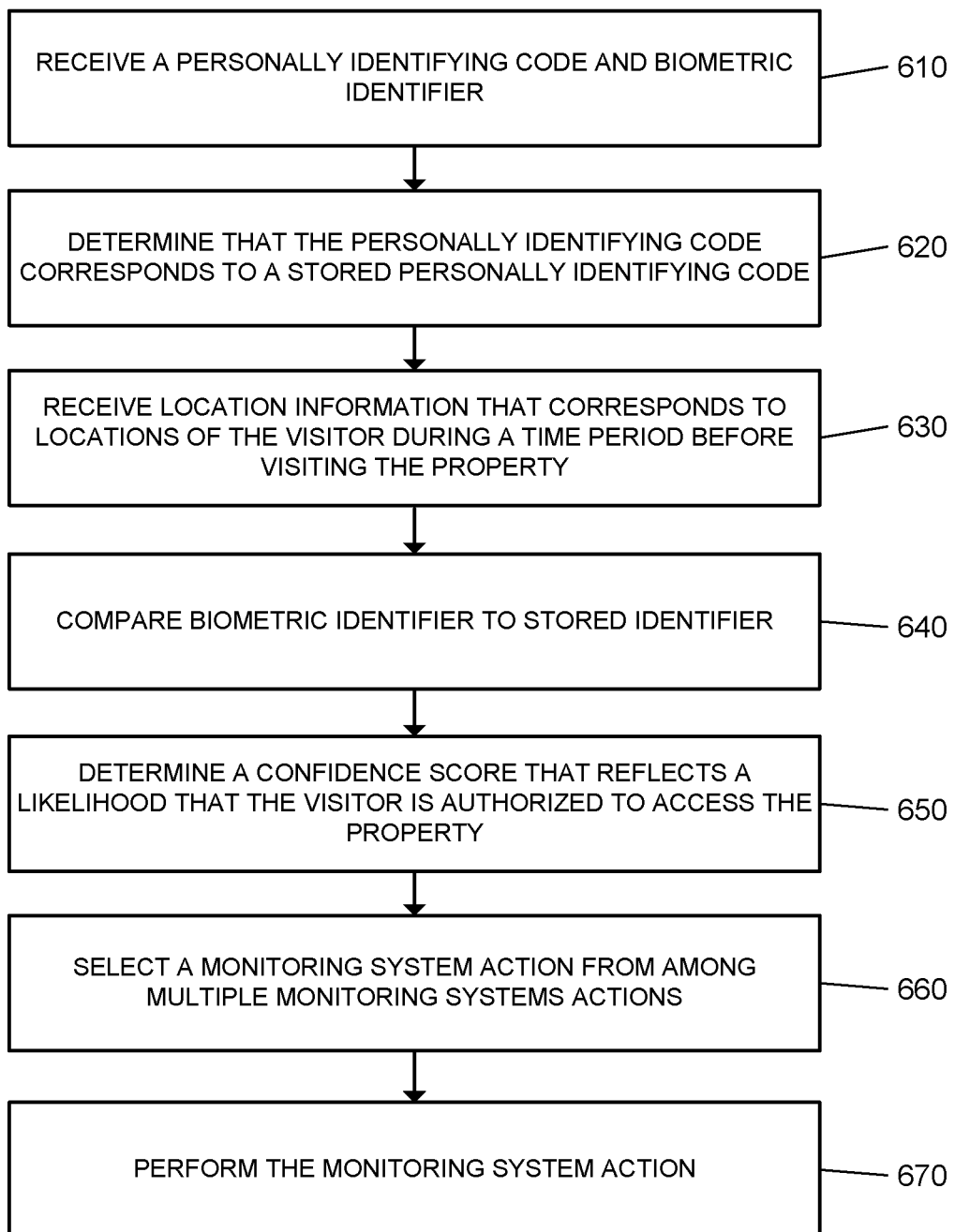
FIG. 6 is a flow chart of an example process for performing a monitoring system action.

FIG. 6 is a flow chart of an example process for performing a monitoring system action. The monitoring system (e.g., a monitoring server of the monitoring system) receives a personally identifying code and a biometric identifier from a visitor to the property (610). The visitor to the property may be a technician that was scheduled for a service appointment at the monitored property. Prior to arriving at the monitored property for the service appointment, the technician enrolls in a service that validates and dispatches technicians to a service request. The service may be managed by a managing server that is configured to verify and store biometric information associated with the several different technicians that are registered with the service. The managing server may request the biometric information from the technician at the time of hiring, and may use the biometric information to later verify the employee's identity. The managing server may perform background checks on the technicians at the time of hiring to ensure that the hired technician does not have any past indiscretions on record. The biometrics information requested by the server may include finger print scans, retina scans, images, voice recordings, and other suitable biometric type data. The managing server may store the biometrics data associated with each of the one or more technicians that are registered with the server. In some implementations, when a technician registers with the managing server, the managing server provides the technician with a biometric token that may be used to verify the technician biometric data when the technician arrives at a property to perform service. In these implementations, the biometric token may be a time sensitive token that is only valid when the technician is in good standing with the managing server. In some examples, the biometric token may be provided to the technician when the technician is scheduled for an appointment at a monitored property. The managing server may provide the biometric token to the monitoring server, and the monitoring server may store in memory.

When a resident from the monitored property requests an appointment with a technician, the monitoring server communicates the request to the managing server. The managing server identifies a technician and assigns the technician a personally identifying code that must be used to disarm the monitoring system at the monitored property. The personally identifying code assigned to the technician may be a time sensitive PIN code that is only valid during the scheduled appointment time. The managing server communicates the technician demographic information, the assigned PIN code, and biometric data received from the technician to the monitoring server. In some examples, the managing server may not assign a personally identifying code to the technician until the technician arrives at the monitored property for the service appointment. In these examples, the managing server may send an SMS text to the technician's mobile device when the GPS location of the mobile device confirms the technician is at the monitored property. The managing server may simultaneously communicate the assigned personal identifying code to the monitoring server.

When the technician arrives at the monitored property, the technician may provide the assigned personally identifying code into a display of a control panel of the monitoring system. The personally identifying code may be a four-digit PIN code or may be an alphanumeric code. In some examples, when the technician enters the personally identifying code to disarm the monitoring system, the control panel may automatically prompt the technician to provide a biometric identifier. For example, the control panel may generate an audible message prompting the technician to face the control panel to provide a retina scan. In some examples, the control panel may automatically capture the biometric identifier while the technician is entering their personally identifying code. For example, the control panel may capture one or more images of the technician as the technician enters their personally identifying code into the display of the control panel. In other examples, the technician may possess a device that may authenticate the technician based on facial recognition. For example, the technician may possess a mobile device configured to perform facial recognition. The device may be a device issued to technicians registered with the service. The device may have GPS capability and may prompt the technician to provide their personally identifying code and facial scan through the device. The device may prompt the technician when the device determines that the technician is at the monitored property. In some examples, the control panel for the monitoring system may be configured to perform facial recognition. For example, when the technician arrives at the property and enters their personally identifying PIN into the control panel, and the control panel automatically performs facial recognition on the technician.

The monitoring server determines that the personally identifying code corresponds to a stored personally code (620). The monitoring server compares the personally identifying code received at the control panel by the technician to the personally identifying code assigned to the scheduled technician. When the monitoring system determines that the received code matches the stored code, the monitoring server receives location information that corresponds to locations of the technician/visitor during a time period before visiting the property (630). The managing server manages the dispatch of the technician to the monitored property, and may track the location of the technician. A technician may check in to a service appointment at some time before the scheduled appointment. The managing server requires the technician to check into the service appointment when the technician is on the way to the appointment. For example, the technician may check in 45 minutes before a scheduled appointment based on an estimated travel time of 40 minutes. The managing server tracks the GPS location of the technician to ensure the technician does not make any unwarranted detours or stops while on the way to the monitored property. The managing server may generate an alert to the resident client device if the technician is determined to make any such unwarranted detours or stops while on the way to the service appointment at the property. In some implementations, the technician mobile device may track the GPS location of the technician. In other implementations, the technician's vehicle may be equipped with a GPS tracker. The monitoring server compares the biometric identifier to a store identifier (640). In some implementations, the monitoring server may provide the received biometric identifier to the managing server, and the managing server compares the received biometric identifier to the one or more biometric identifiers of registered technicians. In some implementations, when the technician is provided a biometric token by the managing server, the technician may provide the biometric token for verification. The monitoring server receives the biometric token and compares the received token to one or more biometric tokens stored in memory.

The monitoring server determines a confidence score that reflects a likelihood that the technician visitor is authorized to access the property based on determining that the personally identifying code corresponds to a stored personally identifying code, the biometric identifier, and the location information (650). The monitoring server may determine a likelihood that the visitor at the property is the assigned technician based on a comparison of the biometric identifier received at the control panel to the stored biometric identifier for the technician. The monitoring server may algorithmically determine a likelihood that the visitor is authorized access to the monitored property based on the whether the personally identifying code and biometrics match the assigned technician, and the travel path of the technician on the way to monitored property for the scheduled appointment. One or more different factors may affect the determination of the confidence score by the monitoring server. Each of the one or more different factors may be weighed differently by the monitoring server to determine the confidence score for authorizing access to the monitored property. For example, the monitoring server may decrease the confidence score based on the location information indicating that the technician deviated from an expected travel path. The monitoring server may decrease the confidence score based on the technician making unexpected stops on the way to the monitored property. The monitoring server may consider the time of day of the unexpected stops, and the location of the unexpected stops when determining the confidence score. For example, an unexpected stop at a liquor store may lower the confidence score more than an unexpected stop at a fast food restaurant. For another example, an unexpected stop made around 2:00 PM may lower the confidence more than an unexpected stop made around 12:00 PM, based on an assumption that the technician stopped for lunch. The length of the unexpected stop may also affect the determination of the confidence score. The monitoring server may increase a confidence score based on determining the technician traveled the expected travel path based on the received location information.

In some implementations, the technician's vehicle may be equipped with a camera that is used to detect the number of persons within the vehicle. In these implementations, when a camera detects that the technician's vehicle includes more than an allotted number of persons, the managing server communicates this data to the monitoring server. The monitoring server may lower a confidence score based on the number of persons in the technician vehicle exceeding the allotted number. In some examples, the monitoring server may deny access to the monitored property based on the number of persons in the technician vehicle exceeding the allotted number. The monitoring server may increase a confidence score when the number of persons in the technician's vehicle is the allotted number. The monitoring server may increase a confidence score based on the time the technician arrives at the monitored property. For example, the confidence score may be 90% when the technician arrives two minutes before the scheduled service appointment. The monitoring server may decrease a confidence score based on the technician being late for a scheduled appointment. For example, the confidence score may be 60% when a technician is an hour late to an appointment. The lower confidence score reflects the likelihood that a visitor who arrives an hour later than a technician appointment may not be the technician.

The monitoring server selects from among multiple monitoring system actions, a monitoring action based on the confidence score that reflects the likelihood that the visitor is authorized to access the property (660). The monitoring server commands the monitoring system to perform the monitoring system action (670). The monitoring server may command the monitoring system to select and perform a monitoring system action based on the determined confidence score. When the confidence score exceeds a confidence score threshold, the monitoring server determines that the technician/visitor is authorized to access the monitored property. The monitoring system is disarmed when the monitoring server determines the technician/visitor is authorized to access the monitored property. For example, when the confidence score is 95% and exceeds the 90% confidence score threshold, the monitoring server disarms the monitoring system. When the confidence score is below the confidence score threshold, the monitoring server does not disarm the monitoring system. In some implementations, the monitoring server may generate an alarm condition when the confidence score does not exceed the confidence score threshold.

When the technician is provided access to the monitored property, one or more cameras located throughout the monitored property monitor the technician's activity. Each room within the monitored property may be equipped with one or more pan/tilt cameras that may pan and or tilt to capture images of the technician. The monitoring server may determine when the technician enters a restricted area of the property based on the data received from the one or more cameras. The monitoring server may generate an alarm condition based on the monitoring server determining that the technician entered a restricted area. In some implementations, when the technician is provided access to the monitored property, the monitoring server may deploy a drone to monitor the activity of the technician within the monitored property.

In some implementations, where the technician is equipped with a body camera, the body camera may automatically begin to record when the technician is provided access to the monitored property. The body camera may communicate the captured video data to the monitoring server that uses video analytics to process the video stream. The monitoring server may trigger an alarm condition or an alert to the resident of the monitored property based on the analyzed video data. The monitoring server may determine when the technician has moved to a restricted area of the property. For example, the monitoring server may determine when the technician enters the master bedroom. The monitoring server may generate an alarm condition based on determining the technician entered a restricted area of the property. In some examples, the monitoring server may generate a notification to the mobile device of the resident. The generated notification may include a link to download a livestream of the technician's body camera video. In other examples, the monitoring server may trigger an audible alarm at the monitored property. The monitoring server may use deep learning techniques to facilitate real time object detection and classification. Based on the real time object detection and classification, the monitoring server may determine whether the technician is viewing restricted objects. For example, the monitoring server may process the video data to determine the technician is looking at jewelry or other valuable objects within the property. The monitoring server may generate an alarm condition based on the technician viewing unexpected objects within the property.

Although the one or more user devices 240 are shown as communicating with the monitor control unit 210, the one or more user devices 240 may communicate directly with the sensors and other devices controlled by the monitor control unit 210. In some implementations, the one or more user devices 240 replace the monitoring system control unit 210 and perform the functions of the monitoring system control unit 210 for local monitoring and long range/offsite communication.

Other arrangements and distribution of processing is possible and contemplated within the present disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A monitoring system that is configured to monitor a property, the monitoring system comprising:
   an input device that is configured to detect a personally identifying code of a visitor;
   a monitor control unit that is configured to:
      receive, from the input device, the personally identifying code;
      based on the personally identifying code of the visitor corresponding to a stored personally identifying code of a known visitor, receive location information that corresponds to locations of the visitor during a time period before receiving the personally identifying code of the visitor that identifies a path traveled by the known visitor during the time period;
      determine that the path travelled by the known visitor deviates from an expected travel path, based on a discrepancy between the location information and the stored list of expected locations; and
      in response to the deviation from the expected travel path perform a first monitoring system action that comprises denying the known visitor access to the property.

2. The system of claim 1, wherein the monitoring control unit is configured to perform a second monitoring system action by disarming the monitoring system and granting the visitor access to the property.

3. The system of claim 2, comprising:
   a camera that is located at the property and that is configured to generate image data,
   wherein the monitor control unit is configured to:
   receive the image data; and
   in response to granting the visitor access to the property, monitor the visitor by analyzing the image data.

4. The system of claim 3, wherein the monitoring control unit is configured to:
   determine, based on the image data, that the visitor entered an area of the property identified, by a resident of the property, as restricted to the visitor; and
   in response to determining that the visitor entered the area of the property identified as restricted to the visitor, transmit, to a computing device of the resident of the property, an alert notification indicating that the visitor entered the area of the property identified as restricted to the visitor.

5. The system of claim 2, wherein the monitor control unit is configured to:
   in response to granting the visitor access to the property, monitor the visitor using a body camera worn by the visitor.

6. The system of claim 5, wherein the monitoring control unit is configured to:
   determine, based on data received from the body camera worn by the visitor, that the visitor entered an area of the property identified, by a resident of the property, as restricted to the visitor; and
   in response to the visitor entering the area of the property identified as restricted to the visitor, generate an alarm event.

7. The system of claim 1, wherein the monitoring control unit is configured to:
   determine a confidence score that reflects a likelihood that the visitor is authorized to access the property.

8. The system of claim 7, wherein the monitoring server is configured to:
   wherein the monitoring control unit is configured to:
   based on determining that the path traveled by the known visitor deviates from the expected travel path, decrease the confidence score that reflects the likelihood that the visitor is authorized to access the property.

9. The system of claim 7, wherein the monitoring server is configured to:
   wherein the monitoring control unit is configured to:
   determine that the known visitor deviated from the expected travel path during a time of day when the known visitor is authorized to deviate from the expected travel path; and
   based on determining that the known visitor deviated from the expected travel path during the time of day when the visitor is authorized to deviate from the expected travel path, increase the confidence score that reflects the likelihood that the visitor is authorized to access the property.

10. The system of claim 7, wherein the monitoring server is configured to:
    wherein the monitoring control unit is configured to:
    based on determining that the path traveled by known the visitor corresponds to the expected travel path, increase the confidence score that reflects the likelihood that the visitor is authorized to access the property.

11. A computer-implemented method to monitor a property comprising:
    receiving by a monitoring control unit, from an input device, a personally identifying code of a visitor;
    based on the personally identifying code of the visitor corresponding to a stored personally identifying code of a known visitor, the monitoring control unit receiving location information that corresponds to locations of the visitor during a time period before receiving the personally identifying code of the visitor that identifies a path traveled by the known visitor during the time period;
    determining, by the monitoring control unit, that the path travelled by the known visitor deviates from an expected travel path, based on a discrepancy between the location information and the stored list of expected locations; and
    in response to the deviation from the expected travel path the monitoring control unit performing a first monitoring system action that comprises denying the known visitor access to the property.

12. The method of claim 11, wherein the monitoring control unit is configured to perform a second monitoring system action by disarming the monitoring system and granting the visitor access to the property.

13. The method of claim 12, comprising:
receiving, from a camera that is located at the property and that is configured to generate image data, the image data; and
in response to granting the visitor access to the property, monitoring the visitor by analyzing the image data.

14. The method of claim 13, comprising:
determining, based on the image data, that the visitor entered an area of the property identified, by a resident of the property, as restricted to the visitor; and
in response to determining that the visitor entered the area of the property identified as restricted to the visitor, transmitting, to a computing device of the resident of the property, an alert notification indicating that the visitor entered the area of the property identified as restricted to the visitor.

15. The method of claim 12, comprising:
in response to granting the visitor access to the property, monitoring the visitor using a body camera worn by the visitor.

16. The method of claim 15, comprising:
determining, based on data received from the body camera worn by the visitor, that the visitor entered an area of the property identified, by a resident of the property, as restricted to the visitor; and in response to the visitor entering the area of the property identified as restricted to the visitor, generating an alarm event.

17. The method of claim 11, comprising:
determining a confidence score that reflects a likelihood that the visitor is authorized to access the property.

18. The method of claim 17, comprising:
based on determining that the path traveled by the known visitor deviates from the expected travel path, decreasing the confidence score that reflects the likelihood that the visitor is authorized to access the property.

19. The method of claim 17, comprising:
determining that the known visitor deviated from the expected travel path during a time of day when the known visitor is authorized to deviate from the expected travel path; and
based on determining that the known visitor deviated from the expected travel path during the time of day when the visitor is authorized to deviate from the expected travel path, increasing the confidence score that reflects the likelihood that the visitor is authorized to access the property.

20. The method of claim 17, comprising:
based on determining that the path traveled by known the visitor corresponds to the expected travel path, increasing the confidence score that reflects the likelihood that the visitor is authorized to access the property.

* * * * *